(12) United States Patent
Hoehn

(10) Patent No.: US 7,659,638 B1
(45) Date of Patent: Feb. 9, 2010

(54) NEUTRAL STARTER INTERLOCK FOR MOTORCYCLES

(76) Inventor: Theodore Paul Hoehn, 8720 Edinboro Rd., McKean, PA (US) 16426

( * ) Notice: Subject to any disclaimer, the term of this patent is extended or adjusted under 35 U.S.C. 154(b) by 547 days.

(21) Appl. No.: 11/698,540

(22) Filed: Jan. 26, 2007

(51) Int. Cl.
*B60R 25/04* (2006.01)
*F16H 59/74* (2006.01)

(52) U.S. Cl. .................................. 307/10.6; 477/99
(58) Field of Classification Search ............... 307/10.3, 307/9.1, 10.6; 477/99; 200/61.88; 180/272
See application file for complete search history.

(56) References Cited

U.S. PATENT DOCUMENTS

| | | | | |
|---|---|---|---|---|
| 4,084,656 A | * | 4/1978 | Itoh et al. | 180/219 |
| 4,172,394 A | * | 10/1979 | Kudo et al. | 477/99 |
| 4,613,026 A | * | 9/1986 | Ohzono et al. | 192/85 AA |
| 6,076,416 A | * | 6/2000 | Sputhe | 74/342 |

FOREIGN PATENT DOCUMENTS

JP        356079028 A   *   6/1981

* cited by examiner

*Primary Examiner*—Albert W Paladini
(74) *Attorney, Agent, or Firm*—Richard K. Thomson

(57) ABSTRACT

A neutral starter interlock for motorcycles, a form of electronic safety circuit, is disclosed. The interlock is designed as a retrofit especially for Harley-Davidson® Big Twin and Sportster® motorcycles manufactured prior to model-year 2007 and factory equipped with an electric starter and a neutral indicator light. The interlock circuit interconnects the neutral indicator circuit (between the battery and the transmission neutral switch) and the starting circuit (between the battery and the starter solenoid) of the motorcycle, and includes an electronic relay that bars current from flowing from the battery to the starter solenoid unless the motorcycle's transmission is in neutral. This prevents unanticipated movement of the motorcycle if an attempt is made to start the engine with the transmission in gear.

3 Claims, 1 Drawing Sheet

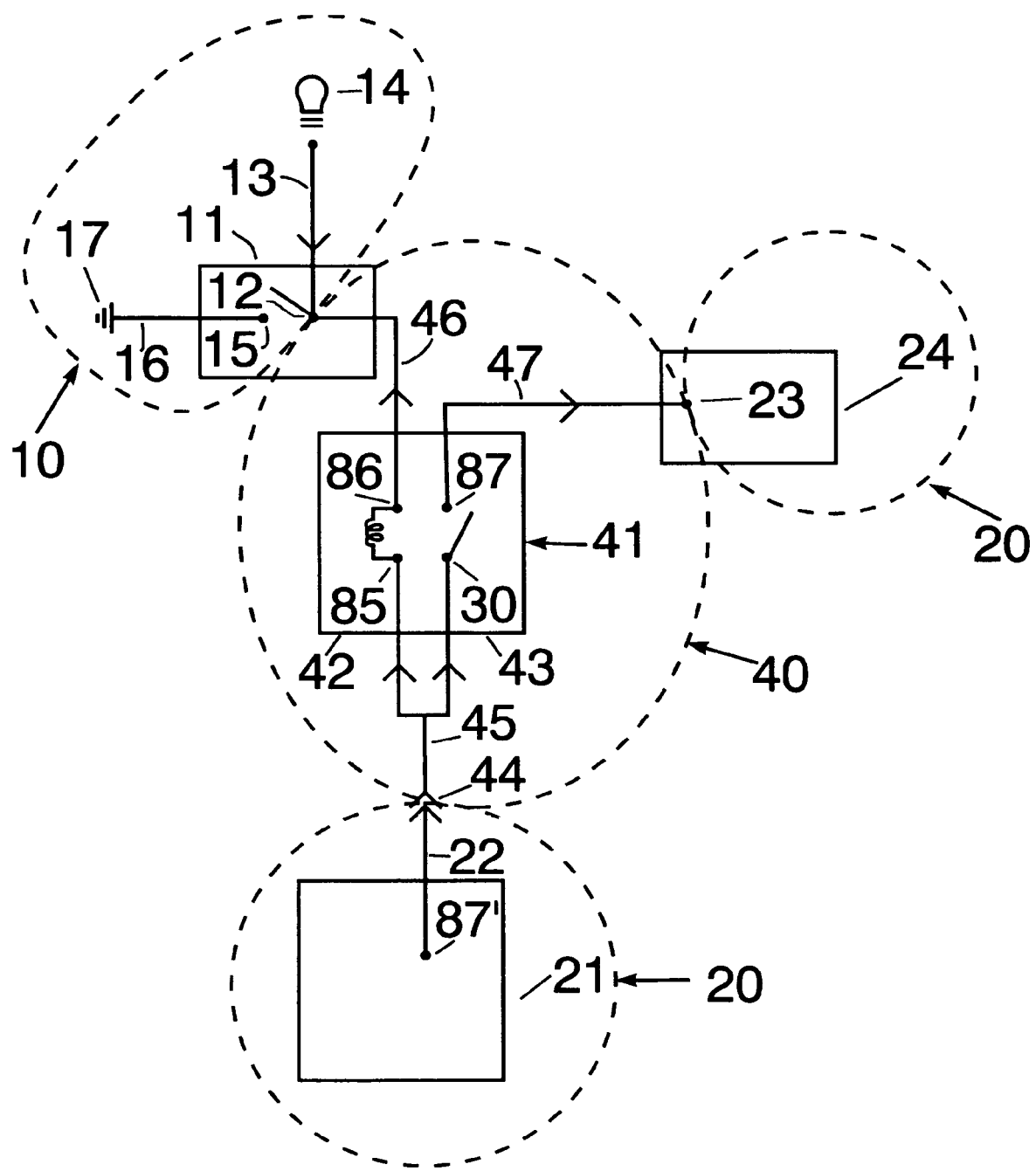

NEUTRAL STARTER INTERLOCK FOR MOTORCYCLES

BACKGROUND AND SUMMARY OF THE INVENTION

The present invention is directed to the field of motorcycles. More specifically, the present invention is directed to a neutral starter interlock, a form of electronic safety circuit, that may be retrofit to Harley-Davidson® Big Twin (encompassing models in the Touring, FXR/Dyna,™ and Softail® families) and Sportster® motorcycles manufactured prior to model-year 2007 and factory equipped with an electric starter and a neutral indicator light. The starter motor on these motorcycles will turn over with the transmission either in neutral or in gear. Starting is uneventful if the transmission is in neutral. With the transmission in gear, however, hitting the electric-starter button causes the motorcycle to lurch forward unless or until the clutch is disengaged. Even if the clutch lever is pulled in before hitting the starter button with the transmission in gear, the motorcycle will typically rock ahead until the clutch plates fully release. The motorcycle lurching forward unexpectedly can result in physical injury to the rider, to a passenger, or to a bystander and/or in damage to the motorcycle or to a nearby vehicle. Hence, a representative Owner's Manual warns: "Before starting engine, always shift transmission to neutral to prevent accidental movement which could result in death or serious injury" (2002 *Harley-Davidson® Owner's Manual, Touring Models*, p. 162).

With the addition of the present invention, the starter motor on one of these motorcycles will turn over and the engine start only when the transmission is in neutral. Hitting the starter button when the transmission is in gear, even with the clutch lever pulled in, results in no action, rather than in forward movement of the motorcycle, as is currently the case.

In apparent recognition of the safety concerns imposed by its traditional starting system, Harley-Davidson Motor Company® has equipped all its model-year 2007 motorcycles with a starter interlock (referred to as a clutch/neutral interlock) that performs a function similar to that of the present invention. Harley-Davidson's stock system for 2007 models (which includes a provision for starting the motorcycle with the transmission in gear if the clutch lever has been pulled in), however, is not designed as a retrofit for earlier models.

The present invention, in the most general terms, represents an improvement in a motorcycle having an engine, a transmission, a transmission neutral switch, an electric starter motor, a starter solenoid for energizing the starter motor, a battery, and electronic circuitry that includes a neutral indicator circuit interconnected between the battery and the transmission neutral switch for illuminating an indicator light whenever the transmission is in neutral and a starting circuit interconnected between the battery and the starter solenoid, activated via an ignition switch and electric-starter button, for enabling the starter motor to initiate engagement of the engine; the improvement comprising an interlock circuit capable of being retrofit within the motorcycle's existing electronic circuitry so as to interconnect the neutral indicator circuit and the starting circuit to prevent the starter motor from initiating engagement of the engine when the transmission is in gear. This interlock circuit comprises an electronic relay interposed within the starting circuit, the relay having a switch side that creates an open circuit between the battery and the starter solenoid when the transmission is in gear, even with the starting circuit otherwise activated. The electronic relay further comprises a coil side connected to the neutral indicator circuit, this connection providing a conduit to ground for the coil side through the closed neutral switch when the transmission is in neutral, thereby closing the switch side of the relay and allowing current to flow from the battery to the starter solenoid when the starting circuit is activated.

Various other features, advantages, and characteristics of the present invention will become apparent after a reading of the following detailed description.

BRIEF DESCRIPTION OF THE DRAWING

The preferred embodiments of the present invention are described in conjunction with the associated drawing, in which like features are indicated with like reference numerals and in which:

The drawing is a circuit diagram of a first embodiment of the present invention, referenced with application to Harley-Davidson Big Twin and Sportster motorcycles.

DETAILED DESCRIPTION OF THE PREFERRED EMBODIMENTS

A circuit diagram of the present invention, a neutral starter interlock for motorcycles, is shown in the drawing, generally at 40 (with direction of electrical current flow indicated by arrows). The neutral starter interlock 40, a form of electronic safety circuit, is inserted within the existing electronics of the motorcycle between, and to interconnect, the neutral indicator circuit, a portion of which is shown at 10, and the starting circuit, portions of which are shown at 20. The neutral indicator circuit 10 includes the transmission neutral switch 11, with tan wire 13 connecting the neutral indicator light 14 to the input post 12 of the switch 11. On recent (1998-2007) Harley-Davidson Big Twins, a black wire 16 connects the output post 15 of the transmission neutral switch 11 to ground 17 (as illustrated in the drawing); on Sportsters and earlier Big Twins, the neutral switch 11 has only an input post 12, and when closed, is grounded directly through contact with the transmission shifter drum. The starting circuit 20 includes the starter relay 21, with green wire 22 that, in the original circuitry, connects Output Pin 87 (87') of the starter relay 21 to the input terminal 23 of the starter solenoid 24.

The neutral starter interlock 40 includes an electronic relay 41, comparable to the starter relay 21, having a coil side 42 with Input Pin 85 (85) and Output Pin 86 (86) and a switch side 43 with Input Pin 30 (30) and Output Pin 87 (87). On the coil side 42 of the interlock relay 41, wire 45 of the interlock circuitry connects to Input Pin 85 (85), and wire 46 of the interlock circuitry connects Output Pin 86 (86) to the input post 12 of the transmission neutral switch 11. Wire 45 of the interlock circuitry, besides connecting to Input Pin 85 (85), also connects to Input Pin 30 (30) on the switch side 43 of the interlock relay 41, and wire 47 of the interlock circuitry connects Output Pin 87 (87) to the input terminal 23 of the starter solenoid 24. With the neutral starter interlock 40 installed, green wire 22 of the starting circuit 20 connects to input wire 45 of the interlock circuitry, at interwire connector 44 (as shown in the drawing), rather than directly to the input terminal 23 of the starter solenoid 24, as in the original circuitry.

In operation, switch side 43 of the interlock relay 41 is open whenever the motorcycle's transmission is in gear. This bars current from flowing from Output Pin 87 (87') of the starter relay 21 to the starter solenoid 24, and prevents unanticipated movement of the motorcycle if an attempt is made to start it in gear. When the motorcycle is in neutral, the transmission neutral switch 11 is closed, completing the neutral indicator circuit 10 by connecting the indicator light 14 to ground 17.

Coil side 42 of the interlock relay 41 is likewise grounded through the closed transmission neutral switch 11, via wire 46 of the interlock circuitry, causing switch side 43 of the interlock relay 41 to close, thereby allowing current to flow from Output Pin 87 (87') of the starter relay 21 to the starter solenoid 24 when the starting circuit 20 is activated.

Various changes, alternatives, and modifications will become apparent to a person of ordinary skill in the art after a reading of the foregoing specification. For example, with the neutral starter interlock 40 having been disclosed as being positioned between the starter relay 21 and the starter solenoid 24 within the starting circuit 20, and connected directly to the transmission neutral switch 11 of the neutral indicator circuit 10, it will be understood that the interlock 40 alternatively can be linked to the starting circuit 20 and/or to the neutral indicator circuit 10 at other locations within these circuits (not shown in their entireties in the drawing) without departing from the scope of this invention. It is intended that all such changes, alternatives, and modifications as fall within the scope of the appended claims be considered part of the present invention. This invention, furthermore, although designed specifically to function as a neutral starter interlock on Harley-Davidson motorcycles, and described in the preceding with explicit reference to such application, is not meant to be limited in embodiment to that particular brand.

I claim:

1. An improvement in a motorcycle having an engine, a transmission, a transmission neutral switch, an electric starter motor, a starter solenoid for energizing the starter motor, a battery, and electronic circuitry that includes a neutral indicator circuit interconnected between the battery and the transmission neutral switch for illuminating an indicator light whenever the transmission is in neutral and a starting circuit interconnected between the battery and the starter solenoid, activated via an ignition switch and electric-starter button, for enabling the starter motor to initiate engagement of the engine; the improvement comprising:

an interlock circuit capable of being retrofit within the motorcycle's existing electronic circuitry so as to interconnect the neutral indicator circuit and the starting circuit to prevent the starter motor from initiating engagement of the engine when the transmission is in gear.

2. The improvement of claim 1 wherein said interlock circuit comprises an electronic relay interposed within the starting circuit, said relay having a switch side that creates an open circuit between the battery and the starter solenoid when the transmission is in gear, even with the starting circuit otherwise activated.

3. The improvement of claim 2 wherein said electronic relay further comprises a coil side connected to the neutral indicator circuit, this connection providing a conduit to ground for said coil side through the closed neutral switch when the transmission is in neutral, thereby closing the switch side of the relay and allowing current to flow from the battery to the starter solenoid when the starting circuit is activated.

* * * * *